United States Patent [19]

Gockel

[11] 4,424,723
[45] Jan. 10, 1984

[54] PORTABLE HAND CONTROL APPARATUS

[76] Inventor: Don A. Gockel, 6640 N. Columbia Ave., Moorpark, Calif. 93021

[21] Appl. No.: 298,375

[22] Filed: Sep. 1, 1981

[51] Int. Cl.³ .................. G05G 1/14; G05G 13/00
[52] U.S. Cl. .................... 74/482; 74/524;
            192/3 TR; 403/100; 403/102
[58] Field of Search .............. 74/481, 482, 524;
            192/3 R, 3 TR; 403/100, 102

[56] References Cited

U.S. PATENT DOCUMENTS

| | | | |
|---|---|---|---|
| 565,365 | 8/1896 | Pryor | 74/524 |
| 1,036,222 | 8/1912 | Griffenberg | 403/102 |
| 2,481,966 | 9/1949 | Zivi | 74/481 |
| 3,065,647 | 11/1962 | Whitmore | 74/482 X |
| 3,199,365 | 8/1965 | Cameron et al. | 74/482 |

Primary Examiner—Allan D. Herrmann
Attorney, Agent, or Firm—Stanley E. Anderson, Jr.; George C. Myers, Jr.

[57] ABSTRACT

A portable hand control device for operating the brake and accelerator foot pedals of a motor vehicle is disclosed. The device comprises a pair of collapsible control rods, each swivelingly connected at one end to a respective foot pedal clamp and at the other end to an elongate handle adapted to be held in either hand of the user. The handle and control rods are free of any operative connection to the motor vehicle apart from the foot pedal clamps.

8 Claims, 4 Drawing Figures

PORTABLE HAND CONTROL APPARATUS

BACKGROUND OF THE INVENTION

The present invention relates to hand control devices for the brake and accelerator pedals of motor vehicles and more particularly to a portable hand control device by which a person who does not have the use of his lower extremities is enabled to safely operate a motor vehicle equipped with an automatic transmission.

A search of the prior art failed to uncover any prior art references which disclose the portable hand control device of the present invention. A number of patents were uncovered which disclose motor vehicle brake and accelerator control mechanisms of varying design and complexity. The following is a listing of the patents uncovered during the aforementioned search:

U.S. Pat. Nos. 2,481,966; 2,548,240; 2,602,348; 2,707,886; 2,777,335; 2,826,089; 3,065,647; 3,089,560; 3,199,365; 3,275,093; 4,143,734.

Several of the above-listed patents disclose hand control installations for motor vehicles adapted for use by double leg amputees and paraplegics to actuate the brake and accelerator pedals of a motor vehicle and thereby provide such persons with the capability of operating an automobile without assistance. The known hand control installations typically employ a rigid mounting or connection to a fixed automobile component, apart from the usual connections to the brake and accelerator pedals or linkages. For example, the above-listed U.S. Pat. Nos. 2,602,348; 2,707,886; 2,777,335; 2,826,089; 3,065,647; 3,089,560; and 4,143,734 each disclose a linkage system for an automotive vehicle hand control having one or more rigid and permanent or semi-permanent connections to the steering column of the vehicle. Such connections provide either support, guidance, leverage or a fulcrum for the hand control linkage systems and are essential elements of the systems.

Thus, the known hand control installations for operating the brake and accelerator pedals of an automobile are not truly portable devices inasmuch as a permanent or semi-permanent connection to a fixed automobile component is required, such as a connection to the steering column or floorboard of the automobile.

U.S. Pat. Nos. 2,481,966 and 3,199,365 each disclose a device for controlling the operation of a single pedal of an automotive vehicle by means of a telescoping rod secured to the pedal.

One of the most pressing needs of individuals who do not have the use of their lower extremities, such as amputees and paraplegics, is the necessity for mobility independently of others. Recognition of that need in recent years has resulted in certain improvements in facilities and services at transportation terminals to accommodate amputee and paraplegic travelers. For example, with sufficient advance notice, some automobile rental agencies provide automobiles which are specially-equipped for operation by paraplegics and amputees. However, the requirement for advance notice to the rental agency in most instances is at least 72 hours—and the limited number and models of the specially-equipped automobiles still provide an unnecessary barrier to the mobility of paraplegic and amputee travelers.

SUMMARY AND OBJECTS OF THE INVENTION

In view of the foregoing limitations and shortcomings of the prior art installations, as well as other disadvantages not specifically mentioned above, it should be apparent that there still exists a need in the art for a portable hand control device for use by persons such as paraplegics and amputees to operate the brake and accelerator pedals of a motor vehicle. It is, therefore, a primary objective of this invention to fulfill that need by providing a compact, portable hand control device which requires no connection to or support by any fixed automobile component, apart from the necessary connections to the brake and accelerator pedals of the motor vehicle.

More particularly, it is an important object of this invention to provide a portable hand control device for an automotive vehicle which can be installed on and removed from any standard motor vehicle in a matter of minutes, without the need for any tools, and which is foldable to a compact size suitable for transporting on the person, for example, in an ordinary briefcase, suitcase or handbag.

It is another object of this invention to provide a remarkably simple and inexpensive, yet effective and safe, hand control apparatus for use by paraplegics and amputees to operate the brake and accelerator pedals of an automotive vehicle.

Yet another object of the present invention is to provide a hand control device for the brake and accelerator pedals of an automotive vehicle which has a freely movable or free-floating operating mechanism adapted to be held in and actuated by either hand of the vehicle operator.

Still another object of the invention is to provide a portable hand control device for automobiles which is collapsible and foldable to a relatively small size, yet remains as a unitary device comprising a plurality of interconnected, articulated elements.

Briefly described, the aforementioned objects are accomplished according to the invention by providing a hand control device comprising a pair of collapsible or foldable rods, each rod having a clamping element connected at one end thereof for operatively securing the control rods to the brake and accelerator pedals, respectively. The brake control rod is rigidly affixed to an operator element comprising an elongate handle member having a throughbore at one end thereof. The accelerator control rod slidably extends through the bore in the handle member and terminates at a knob element. Each control rod is connected to its respective pedal clamp by means of a universal or swivel joint connection so that the handle member and associated knob element are substantially freely movable or free-floating. Thus, the handle member may be held or positioned to suit the comfort and convenience of the operator and thereby aid in preventing operator fatigue.

Neither the elongate handle member and knob element nor the control rods are connected to any fixed part of the vehicle, other than the connections to the foot pedals provided by the foot pedal clamping elements. Hand and thumb or finger pressure applied, respectively, axially of the brake control rod via the handle member and axially of the accelerator control rod via the knob element operate the respective brake and accelerator pedals.

A pair of springs interposed between the back surface of the brake pedal and one of the clamping bars of the brake pedal clamp precludes slippage of the clamp from the brake pedal that may otherwise result from vibration forces or other forces tending to dislodge the pedal clamp. Preferably, each foldable control rod has a pivotable joint located intermediate the ends of the rod and a sleeve member slidable along the rod to a point at which the sleeve member encompasses the pivotable joint and thereby rigidifies and locks the joint. Alternately, each control rod may be formed as a rigid rod member without a lockable pivot joint intermediately thereof.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

Figure 1:
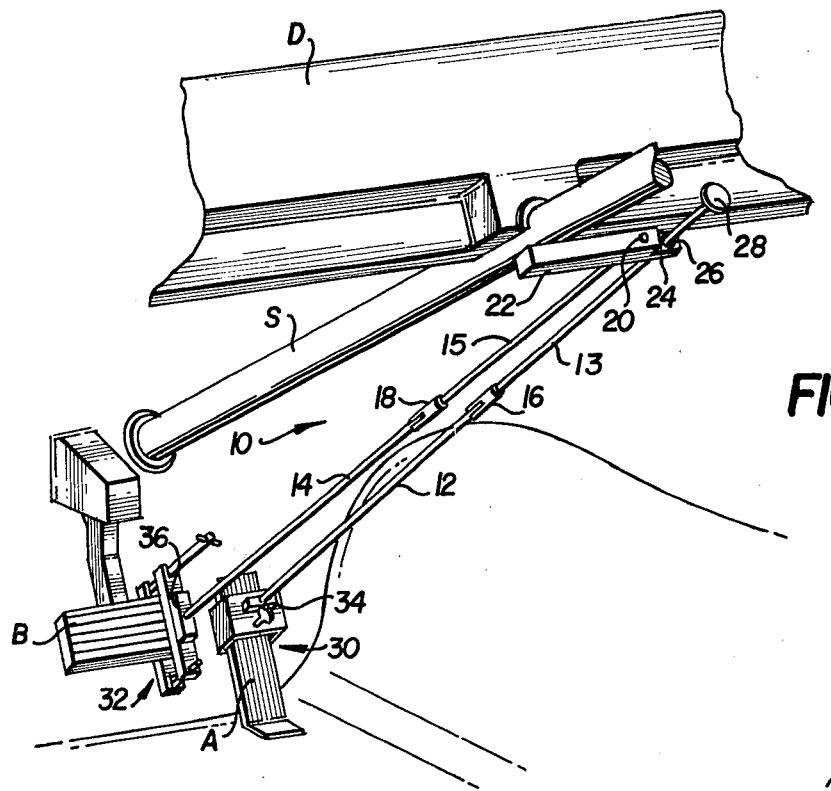
FIG. 1 is a perspective view of the hand control apparatus of the present invention showing the apparatus installed on the brake and accelerator pedals of a standard automobile with an automatic transmission.

Referring now in detail to the drawings wherein like parts are designated by like reference numerals throughout, there is illustrated in FIG. 1 the portable hand control device of the present invention which is designated generally by reference numeral 10. The device 10 is shown connected to the accelerator and brake pedals A and B, respectively, beneath the steering column S and dashboard D of an automobile vehicle with an automatic transmission.

The device 10 comprises an accelerator control rod, 13 and a brake control rod 14, 15 each having an identical intermediate joint means 16, 18, respectively, to permit folding of the rods 12, 13 and 14, 15 to approximately half their total length as shown in FIG. 1. The joint means are described in more detail hereinafter in connection with FIG. 4. The upper end of control rod 15 is rigidly affixed as at reference numeral 20 to an elongate handle member 22 which is formed as a rectangular bar with a stepped end portion 24. The upper end of control rod 13 slidably extends through a bore 26 in end portion 24 and has a knob element 28 affixed thereto. The lower ends of the rods 12, 14 are connected respectively to an accelerator clamp 30 and a brake clamp 32 by swivel joint connections 34, 36. Details of the clamps 30, 32 and connections 34, 36 are shown in FIGS. 2 and 3 and are described in greater detail hereinafter.

As illustrated in FIG. 1, the handle member 22 is not secured directly to the steering column S or any other component of the vehicle, but rather is freely movable or free-floating by reason of the absence of any such connection and the swivel joint connections to the accelerator and brake pedal clamps 30, 32. Thus, the operator may hold the handle member 22 in either hand and position the same upwardly or downwardly, right or left to a certain extent to suit his comfort and convenience.

Operation of the vehicle pedals is effected by grasping the handle member 22 with either hand and positioning the thumb on the knob element 28. As will be appreciated, this can be readily accomplished with the right hand by grasping the handle member 22 from underneath and with the left hand by grasping the handle member 22 from above. Application of pressure through the handle member 22 axially of the control rod 14, 15 actuates the brake pedal B to slow or stop the vehicle as desired. Application of thumb pressure through the knob element 28 axially of the control rod 12, 13 actuates the accelerator A to cause vehicle acceleration.

Figure 2:
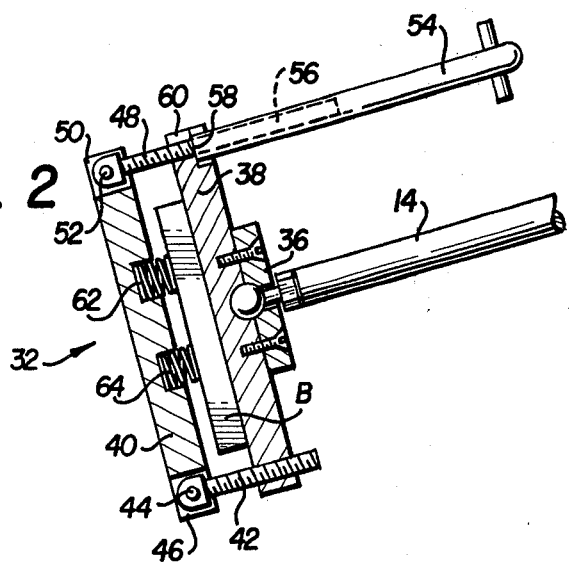
FIG. 2 is a side view partly in cross-section illustrating the construction of the brake pedal clamp of the hand control device of the present invention.
Figure 3:
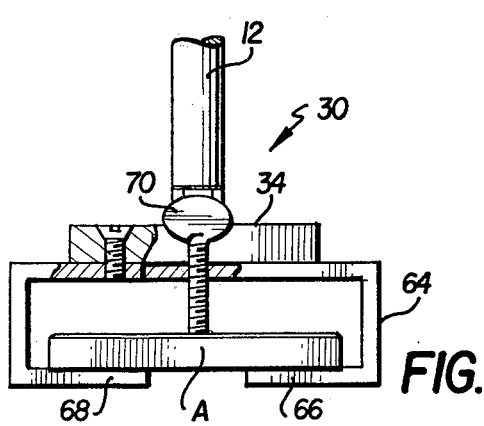
FIG. 3 is an end view partly in section illustrating the accelerator pedal clamp of the hand control device of the invention.

Referring now to FIG. 2, the brake clamp 32 is shown connected to brake control rod 14 via swivel joint 36 which, in the illustrated embodiment, comprises a conventional ball-and-socket joint but which may be formed by any suitable connection providing the requisite joint articulation. The clamp 32 comprises an upper bar member 38 and a lower bar member 40 adapted to be positioned on and clamped to the side of brake pedal B as shown in FIG. 1.

Bar members 38, 40 are hingedly connected together by means of a screw 42 threaded into bar member 38 and pivotally mounted in a slot 46 of bar member 40 with a roll pin 44. The spacing between the bar members can be adjusted prior to installation by screw 42 to accommodate brake pedals of varying design and thickness.

Another screw 48 is pivotally mounted in a slot 50 with a roll pin 52 at the other end of bar member 40. An elongate T-shaped tightening device 54 having an internally threaded bore 56 is threaded to screw 48 and bears upon a shoulder 58 of a U-shaped slot 60 in bar member 38. Rotation of device 54 in a clockwise direction urges the bar members toward one another and increases the clamping force on the brake pedal B.

To minimize the possibility of loosening or slipping of the clamp 32 on the brake pedal B, a pair of compression springs 62, 64 are provided in counterbores of bar member 40 so as to bear against the rear side of brake pedal B when the clamp 32 is installed.

FIG. 3 illustrates the accelerator pedal clamp 30 shown connected to the accelerator control rod 12 via a swivel joint 34. The construction of swivel joint 34 is substantially identical to the ball-and-socket joint 36 shown in FIG. 2 and is, therefore, not illustrated in detail. The clamp 30 is formed by a channel-like bracket 64 having two end portions 66, 68 which engage the rear side edges of the accelerator pedal A. A thumb screw 70 is threaded into the top of bracket 64 and bears upon the forward surface of accelerator pedal A thereby applying a clamping force through the pedal A.

Figure 4:
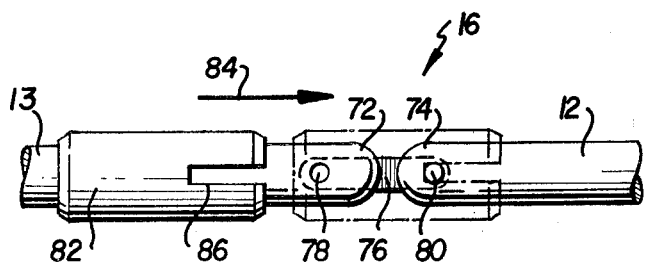
FIG. 4 is a side view of a portion of one control rod illustrating the lockable pivot joint for the control rods of the hand control device of the present invention.

In FIG. 4 there is illustrated structural details of the intermediate folding joint 16 (or 18) of the control rod 12, 13 ( or 14, 15). The joint 16 comprises a pair of confronting rounded ends 72, 74 of the control rods 12, 13 which are articulatingly connected together by means of a link 76 arranged in axial slots (not shown) in the rounded ends 72, 74 and pivotally mounted therein by means of roll pins 78, 80. The ends of roll pin 78 are flush or below flush with the circumferential surface of the rod 13; however, one or both ends of the roll pin 80 extends outwardly beyond the circumferential surface of the rod 12 for a purpose to be described hereinafter.

A locking sleeve 82 is slidably arranged on control rod 12 so as to be movable in the direction shown by the arrow 84 to a position illustrated in phantom lines in FIG. 4. A longitudinal slot or slots 86 are provided in sleeve 82 and are adapted to engage the end or ends, as the case may be, of the roll pin 80 to lock the sleeve against further axial movement and thereby rigidify the joint 16. The sleeves 82 are preferably installed on the rods 13, 15 with the slots 82 oriented toward the clamps 30, 32 to prevent disengagement of the sleeves 82 from the respective joints 16, 18.

Although only a preferred embodiment is specifically illustrated and described herein, it will be appreciated that many modifications and variations of the present invention are possible in light of the above teachings and within the purview of the appended claims without departing from the spirit and intended scope of the invention.

What I claim is:

1. A portable hand control device for operating the accelerator and brake foot pedals of a motor vehicle comprising:

an accelerator control rod and a brake control rod;

clamping means connected to one end of each control rod for removably securing said control rods to a respective foot pedal;

handle means connected to the other end of said brake control rod for operating the brake foot pedal; and means for cooperatively linking said accelerator control rod to said handle means such that the other end of said accelerator control rod is movable relative to said handle means to operate the accelerator foot pedal;

said handle means being free of operative connection to said motor vehicle apart from the connections to said foot pedals.

2. The portable hand control device according to claim 1, including lockable joint means disposed intermediate the ends of each of said control rods for collapsing said control rods and for rigidifying said control rods.

3. The portable hand control device according to claim 2, wherein each control rod comprises two sections hingedly connected to one another in confronting end-to-end relation and a locking sleeve slidable over the confronting ends of said control rod to thereby rigidify and lock said joint means.

4. The portable hand control device according to claim 3, wherein the hinged connection between said two sections comprises a link pivotally connected to each of said two sections such that upon collapse of said joint means, said two sections lie in substantially parallel side-by-side relation.

5. The portable hand control device according to claim 1, wherein each control rod is connected to its associated clamping means by a swivel joint.

6. The portable hand control device according to claim 1, including resilient means interposed between the brake pedal and the clamping means associated therewith for absorbing forces tending to dislodge or loosen said clamping means.

7. The portable hand control device according to claim 1, wherein said means linking said accelerator control rod to said handle means comprises a bore in said handle means, said accelerator control rod extending slidably through said bore.

8. The portable hand control device according to claim 1, wherein said handle means comprises an elongated bar adapted to be grasped in either hand of a user, said brake control rod being rigidly affixed to said bar intermediate the ends thereof, a bore in said bar adjacent one end thereof, said accelerator control rod extending slidably through said bore and a knob element affixed to the other end of said accelerator control rod.

* * * * *